United States Patent [19]

Raw

[11] Patent Number: 4,749,204
[45] Date of Patent: Jun. 7, 1988

[54] CART WHEEL STRUCTURE

[75] Inventor: Robert T. Raw, Round Lake, Ill.

[73] Assignee: Luxor Corporation, Waukegan, Ill.

[21] Appl. No.: 46,101

[22] Filed: May 5, 1987

[51] Int. Cl.$^4$ ............................................. B60B 33/00
[52] U.S. Cl. ............................. 280/79.1 R; 16/35 R; 16/38; 16/47
[58] Field of Search ............. 16/18 R, 30, 37, 38, 16/39, 42 T, 43, 47, 48; 280/79.1 R, 93

[56] References Cited

U.S. PATENT DOCUMENTS 1,849,028  3/1932  Robinson ..................... 280/79.1 R
1,879,429  9/1932  Noelting et al. ..................... 16/38 X Primary Examiner—Fred Silverberg
Attorney, Agent, or Firm—Wood, Dalton, Phillips, Mason & Rowe

[57] ABSTRACT

A cart wheel structure having a pair of wheels rotatably mounted to opposite ends of an axle rod. The axle rod is mounted to a base portion of a cart by a pair of fabricated brackets having an upstanding swivel post adapted to be received in swivel cavities provided on the cart base portion. The swivel cavities are adapted to receive the swivel post of conventional swivel caster whereby the cart may be provided with caster and non-caster wheels as desired. The cooperation between the axle rod and brackets provides an accurate maintained disposition of the wheels carried on the opposite distal ends of the axle rod.

11 Claims, 1 Drawing Sheet

CART WHEEL STRUCTURE

TECHNICAL FIELD

This invention relates to carts and in particular to structures for mounting wheels to carts.

BACKGROUND ART

In one form of wheeled cart, caster wheels are mounted to a base portion of the cart for providing facilitated movement of the cart on a subjacent floor surface as desired.

In one modified form of such wheeled cart, one pair of wheels, conventionally provided at the rear of the base portion, are mounted by means maintaining the wheels aligned in a fore and aft direction.

DISCLOSURE OF INVENTION

The present invention comprehends an improved means for mounting wheels in a cart structure.

More specifically, the invention comprehends the provision of improved cart wheel structure including a cart support structure defining first and second horizontally spaced, downwardly opening sockets, first and second axle rod mounting brackets, each bracket having a base portion, a pair of horizontally spaced depending axle rod support walls having aligned openings therethrough, and an upstanding cylindrical post, the post of the first bracket being rotatably received in the first socket and the post of the second bracket being rotatably received in the second socket, means on the support structure in post for releasably retaining the post in the sockets against axial withdrawal therefrom, first and second wheels each having a hub portion, means for retaining the brackets against rotation comprising an axle rod extending through the holes of each of the support walls of the brackets, the axle rod defining opposite ends projecting outwardly from the outboard support walls of the brackets and means for rotatably retaining the wheels one each on the opposite ends of the axle rod.

In the illustrated embodiment, the rod is right circularly cylindrical.

In the illustrated embodiment, the wheels have a diameter substantially greater than the height of the mounting brackets.

The post defines a vertical axis and the aligned axle rod support wall openings define a common axis intersecting the post vertical axis.

In the illustrated embodiment, the spacing between the axle rod support wall is substantially greater than the diameter of the cylindrical post.

The post defines a vertical axis centered between the axle rod support wall.

In the illustrated embodiment, the axle rod support wall openings of the brackets are circular.

The wheel structure of the present invention is the simple and economical of construction while providing a highly improved cart wheel structure.

DESCRIPTION OF THE DRAWINGS

Other features and advantages of the invention will be apparent from the following description taken in connection with the accompanying drawings wherein.

BEST MODE FOR CARRYING OUT THE INVENTION

Figure 1:
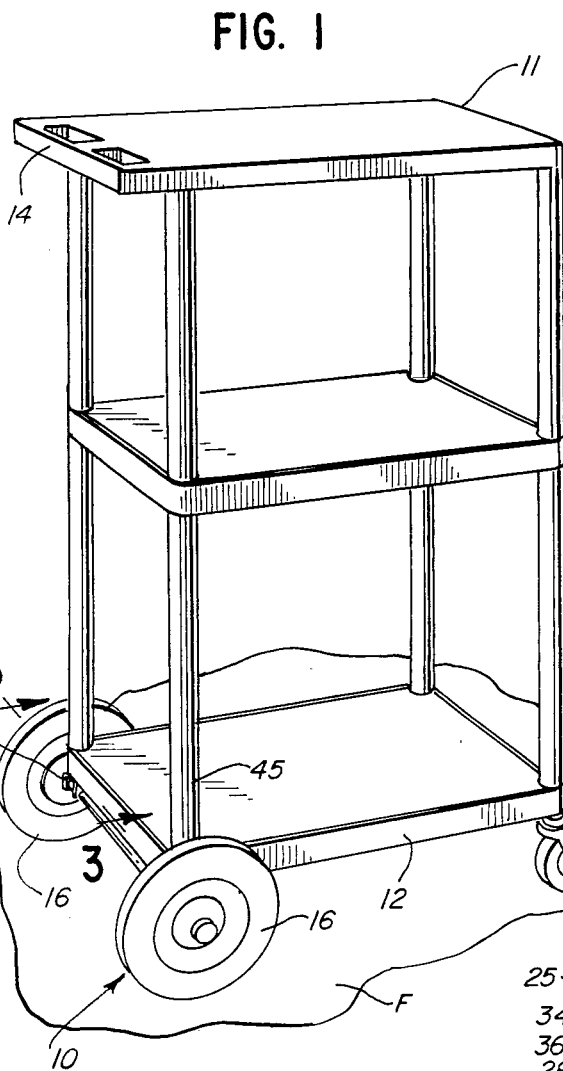
FIG. 1 is a perspective view of a cart having a wheel structure embodying the invention.

In the exemplary embodiment of the invention as disclosed in the drawings, a cart wheel structure generally designated 10 embodying the invention is shown on a cart 11 having a base 12. The cart is further provided with front swivel caster wheels 13 of conventional construction.

The cart may include a handle 14 for use in manipulating the cart in moving it along a subjacent floor surface F.

Base portion 12 is provided at the corners thereof with depending sockets element 15 adapted to swivelly receive swivel post portions (not shown) of the caster wheels 13. The present invention comprehends utilization of two of the socket elements as a portion of the cart wheel structure 10.

More specifically, cart wheel structure 10 includes a pair of relatively large diameter wheels 16 which in the illustrated embodiment comprise 8" rubber tired wheels. The wheels are mounted one each at opposite sides of the rear of base 12 in alignment with the fore and aft direction of the cart.

Wheels 16 are rotatably mounted on the outer end portion 17 of a transverse axle rod 18.

Figure 3:
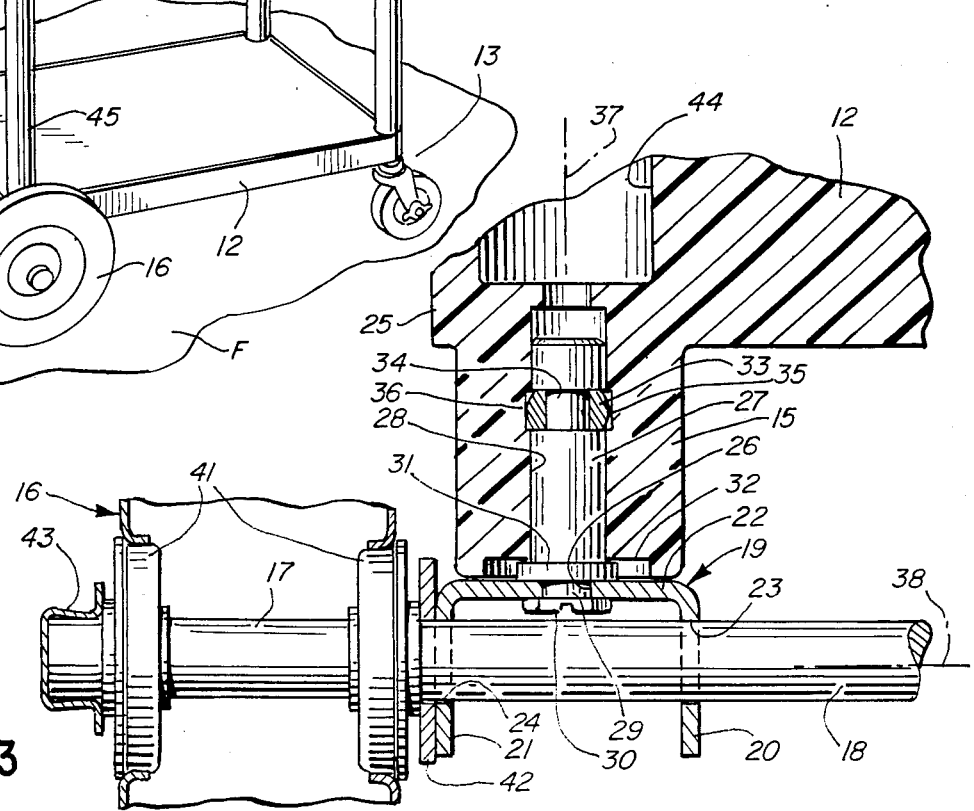
FIG. 3 is a fragmentary enlarged vertical section taken substantially along the line 3—3 of FIG. 1.

Axle rod 18 is mounted to the base 12 by a pair of U-shaped brackets 19 having legs 20 and 21 and a bight portion 22. The legs are provided with aligned openings 23 and 24. As seen in FIG. 3, axle rod 18 extends coaxially through openings 23 and 24 to dispose end portion 17 thereof outboard of the side wall 25 of the cart base.

Bight 22 is provided with an opening 26. A mounting post 27 is fixedly secured to bight 22 to upstand therefrom and be received in a downwardly opening cavity 28 of socket element 15.

The lower end of post 27 is defined by a reduced diameter cylindrical end portion 29 which extends downwardly through opening 26 and which has a lower distal portion 30 radially enlarged as by upsetting thereof. An annular collar 31 on post 27 seats on the bight 22 of bracket 19 to cooperate with radially enlarged distal end 30 in retaining the post fixedly to the bracket. Cavity recess 28 includes an outer radially enlarged distal end 32 receiving the collar 31.

Figure 2:
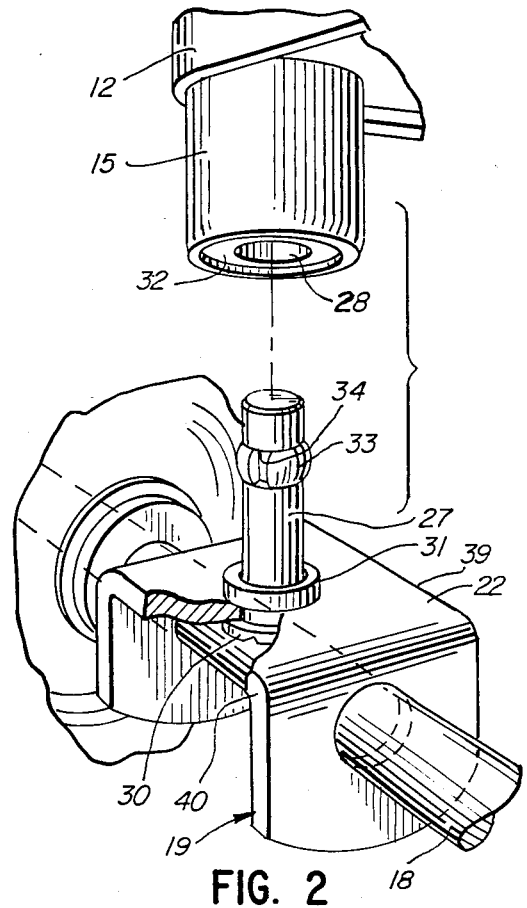
FIG. 2 is a fragmentary enlarged perspective view illustrating the installation of the wheel support means in a base portion of the cart.

Post 27 is retained in cavity 28 against axial withdrawal therefrom by a segmentally annular spring retainer 33 received in an annular groove 34 adjacent the upper end of post 27 as illustrated in FIG. 2. Spring retainer 33 has a normal outside diameter slightly larger than that of the post 27 so as to expand into a radially inwardly opening annular groove 35 in the cavity 28 when the post is fully inserted as shown in FIG. 3. The resilient compressibility of the spring retainer permits the movement of the post into the cavity with the spring retainer compressed into the post groove 34 as the post is moved upwardly to the fully installed disposition of FIG. 3. The outer surface 36 of the spring retainer is preferably rounded to facilitate the radially inward camming of the spring retainer in moving through the cavity 28.

Reversely, if for any reason it is desired to remove the bracket from the cart base, a downward urging of the bracket may be effected to recompress the spring retainer and permit its downward withdrawal through the lower portion of the cavity 28.

In the absence of the axle rod 18 extending through openings 23 and 24 of the bracket legs, the bracket 19 is free to swivel in the cavity 28. Thus, axle rod 18 serves as means for aligning the leg openings of the two brackets at opposite sides of base 12 accurately perpendicularly to the fore and aft extent of the cart.

Post 27 defines a vertical axis 37 and axle rod 18 defines a horizontal axis 38 which intersects post axis 37. Post axis 37 is disposed mid-way between legs 20 and 21 and is centered between opposite edge surfaces 39 and 40 of bight 22.

Wheel 16 includes hub portion 41 rotatably mounted on axle end 17 as illustrated in FIG. 3. A washer 42 is coaxially mounted on the axle rod 18 outboard of bracket leg 21. Hub 16 is maintained juxtaposed to washer 42 by an end cap 43 secured to the distal end of the axle rod as seen in FIG. 3.

Thus, wheels 16 are free to rotate on the axle rod ends 17 about the axle rod axis 38 while axle rod 18 is maintained accurately perpendicular to the fore and aft extent of the cart notwithstanding the swivel mounting of the brackets 19 to the base socket elements 15. The cart wheel structure 10 comprises a complete assembly which may be installed as a unit to the cart base 12 by the simple insertion of the posts 27 of the two brackets 19 in the socket element cavities 28 as discussed above.

Replacement of the wheel structure 10 as by another similar wheel structure or casters 13 if desired may be readily effected by the withdrawal of the posts 27 against the retaining action of the retaining springs 33 of the respective posts. Thus the cart structure permits the cart to be utilized with all casters 13, or one pair of casters 13 and one pair of large wheels 16, as desired.

The cart base 12 may be formed of any suitable material, and in the illustrated embodiment, is molded of synthetic resin, permitting the socket elements 15 to be formed integrally therewith as illustrated in FIG. 3. The base element may further define upwardly opening recesses 44 for receiving the lower ends of upright cart posts 45 shown in FIG. 1. Axle rod 18 and bracket 19 may be formed of a strong material such as steel for long, trouble-free life of the wheel structure. Any suitable wheel 16 may be rotatably mounted to the axle rod end 17 within the broad scope of the invention.

In the illustrated emnbodiment, the axle rod is right circularly cylindrical. Wheels 16 in the illustrated embodiment have a diameter substantially greater than the height of the mounted brackets. The spacing between the legs 20 and 21 is substantially greater than the diameter of the post 27. The diameter of the openings 23 is preferably only slightly greater than the outer diameter of the axle rod 18 so as to provide desired fit therebetween.

The foregoing disclosure or specific embodiments is illustrative of the broad inventive concepts comprehended by the invention.

I claim:

1. A cart wheel structure comprising:
   cart support structure defining first and second horizontally spaced, downwardly opening sockets;
   first and second axle rod mounting brackets, each bracket having a base portion, a pair of horizontally spaced depending axle rod support walls having aligned openings therethrough, and an upstanding cylindrical post, the post of said first bracket being rotatably received in said first socket and the post of said second bracket being rotatably received in said second socket;
   means on said support structure and posts for releasably retaining said posts in said sockets against axial displacement therefrom;
   first and second wheels;
   means for retaining said brackets against rotation comprising an axle rod extending through the holes of each of said support walls, said axle rod defining opposite ends projecting outwardly from the outboard support walls of said pair of brackets; and
   means for rotatably retaining said wheels one each on said opposite ends of the axle rod.

2. The cart wheel structure of claim 1 wherein said rod is right circularly cylindrical.

3. The cart wheel structure of claim 1 wherein said wheels have a diameter greater than the height of said mounting brackets.

4. The cart wheel structure of claim 1 wherein said post defines a vertical axis and said aligned axle rod support wall opening define a common axis intersecting said post vertical axis.

5. The cart wheel structure of claim 1 wherein the spacing between said axle rod support walls is substantially greater than the diameter of said cylindrical post.

6. The cart wheel structure of claim 1 wherein said post defines a vertical axis centered between said axle and support walls.

7. The cart wheel structure of claim 1 wherein said axle rod support wall openings are circular.

8. The cart wheel structure of claim 1 wherein means are provided on said opposite ends of the axle rod for preventing axial displacement of said axle rod.

9. A cart wheel structure comprising:
   a base portion defining downwardly opening similar sockets;
   a pair of swivel caster wheels each having a swivel post; and
   a wheel assembly having an axle rod, wheels rotatably mounted to opposite ends of said axle rod and a pair of brackets each having a swivel post, said brackets being mounted in spaced relationship on said axle rod, said swivel casters being mounted to said cart base portion with the swivel posts thereof swivelly mounted on each in selected ones of said sockets, and said brackets being mounted to said cart base portion with the swivel posts thereof mounted one each in different selected ones of said sockets while being retained against swivelling by said axle rod.

10. The cart wheel structure of claim 9 wherein means are provided for releasably retaining said bracket swivel posts in said sockets.

11. The cart wheel structure of claim 9 wherein said wheels of said wheel assembly comprise wheels substantially larger in diameter than swivel caster wheels.

* * * * *